United States Patent [19]

Lyons

[11] Patent Number: 4,542,944
[45] Date of Patent: Sep. 24, 1985

[54] MULTIPLE DISK BRAKE CONTROL
[75] Inventor: Michael D. Lyons, Lexington, Ky.
[73] Assignee: American Standard Inc., Lexington, Ky.
[21] Appl. No.: 599,402
[22] Filed: Apr. 12, 1984
[51] Int. Cl.[4] .............................................. B60T 13/00
[52] U.S. Cl. .................................. 303/6 R; 303/6 A; 303/52
[58] Field of Search ............... 303/6 R, 6 A, 6 M, 50, 303/52, 57, 40; 175/27, 24; 188/72.7

[56] References Cited
U.S. PATENT DOCUMENTS
3,158,409 11/1964 Hughson et al. .................. 303/57 X
4,121,697 10/1978 Kobelt et al. ....................... 188/72.7

Primary Examiner—Bruce H. Stoner, Jr.
Assistant Examiner—Robert J. Oberleitner
Attorney, Agent, or Firm—G. E. Hawranko

[57] ABSTRACT

A brake control arrangement for use with a multiple disk brake system having a plurality of disk brake actuators which exert a braking force in relation to the fluid pressure presented to a service braking portion contained therein. A handle valve is operable over a range of travel for delivering a braking fluid pressure to be directed to a first input of one of a purality of shuttle valves. This braking fluid pressure, however, is first directed through one of a plurality of flow paths selected by a selector valve arrangement. The selector valve arrangement can be sequenced to direct the initial braking fluid pressure through a different one of the plurality of flow paths upon receiving a sequencing count signal transmitted from a counter valve arrangement. A pilot operated relay valve has a pilot portion which receives the braking fluid pressure and opens the relay valve when the braking fluid pressure reaches a predetermined value. The fluid pressure transmitted through the relay valve is proportional to the braking fluid pressure and is directed to a second input of the plurality of shuttle valves. The shuttle valve outputs are connected to the service braking portions of the disk brake actuators and serve to transmit the higher of the two input fluid pressures to these service braking portions. The counter valve arrangement transmits the sequencing count signal when the parking brake portions of the disk brake actuators have been released.

11 Claims, 4 Drawing Figures

MULTIPLE DISK BRAKE CONTROL

BACKGROUND OF THE INVENTION

This invention relates to a control system for use with multiple disk brake installations. Such multiple disk brake installations can be of use on oil field drilling and service equipment where a light torque braking is needed initially to slow down a string of drilling pipe sections and to prevent sudden disconnection of any pipe joints. It is also required in such multiple disk braking installations that a heavier torque braking be provided thereafter to effect a complete stop even in the presence of any rotational momentum of the pipe string. Where such braking systems have been used in the past, the light torque braking has been accomplished using low pressure levels to the brake actuators and further, to use small incremental changes in the fluid pressure levels to modulate the torque braking. Such use of low pressure levels to operate the disk brake control system has the disadvantage that modulation between various torque braking values is difficult to control over the smaller pressure range generally associated with the low level pressure control systems. Still other control systems for disk brake installations have employed a multiple disk brake arrangement where one disk brake unit provides the initial light torque braking and additional disk brake units provide the heavier torque braking needed. This approach has resulted in the disadvantage of exhibiting uneven brake pad wear and, consequently, higher maintenance costs and downtime for replacement of such worn brake pads.

SUMMARY OF THE INVENTION

It is, therefore, an object of this invention to provide a control system for multiple disk brake installations where the range of torque braking can be varied and the control thereof can be accurately accomplished.

It is a further object of the invention to provide a control system for multiple disk brake installations which exhibits a generally even wear distribution for the brake pads on each of the disk brake units used.

It is yet a further object of the invention to sequentially alternate which of the disk brake units in the multiple disk brake installation provides the initial braking.

Briefly, the invention consists of a number of disk brake actuators rigidly connected to a single shaft wherein each disk brake actuator has a service braking section and a parking brake section. A modulated service brake pressure is provided through a handle valve to one or more pilot-controlled selector valves. In the case of a three-disk brake actuator system, two selector valves distribute the modulated braking pressure to one of the three disk brake actuators according to the count condition of a pneumatic binary counting circuit. A relay valve provides a modified modulated braking pressure to all three disk brake actuators in a fixed relationship to the handle valve output pressure. The relay valve output pressure is directed to all disk brake actuators through a shuttle valve. The output of the selector valve, also directed through the shuttle valve, will be transmitted to the disk brake actuator over the relay valve output since the shuttle valves transmit only the higher of the two input pressures. A manually operated valve and an interlocking valve combine to provide a flow of pressure for releasing the parking brake. The interlock valve insures that the braking pressure from the handle valve is sufficient to hold the load on the service brake before the parking brake is released. The interlocking valve also serves the purpose of triggering an impulse signal pressure to the binary counter circuit to increment the counter circuit to the next count. The binary counter circuit has the ability to count to four. In a three-disk brake actuator system, a count of only three is required. Therefore, a skip valve is needed to skip one count. In this manner, the binary counter circuit only counts to three and is sequenced every time the manually operated valve and the interlocking valve are activated.

DESCRIPTION AND OPERATION

Figure 1:
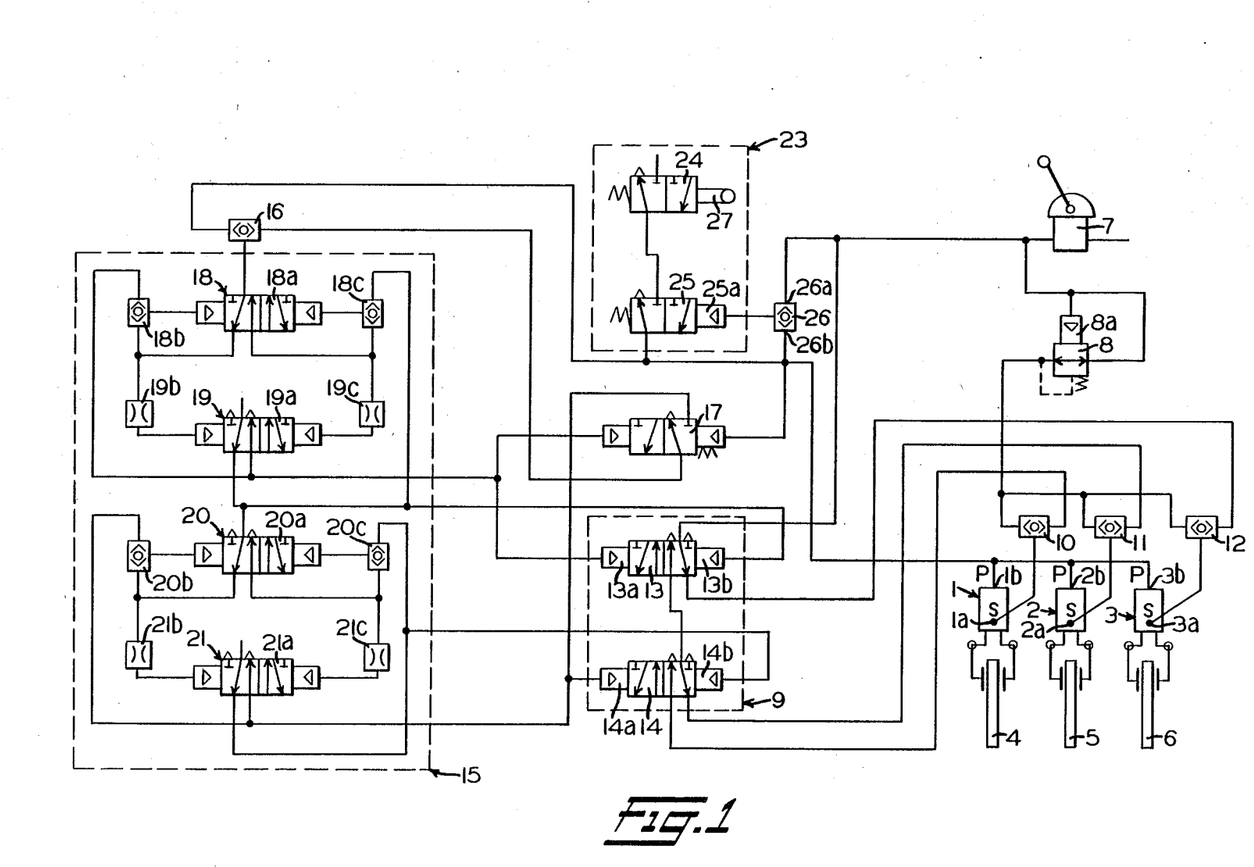
FIG. 1 is a diagrammatical representation of a three-disk brake control system constructed in accordance with the invention.
Figure 2:
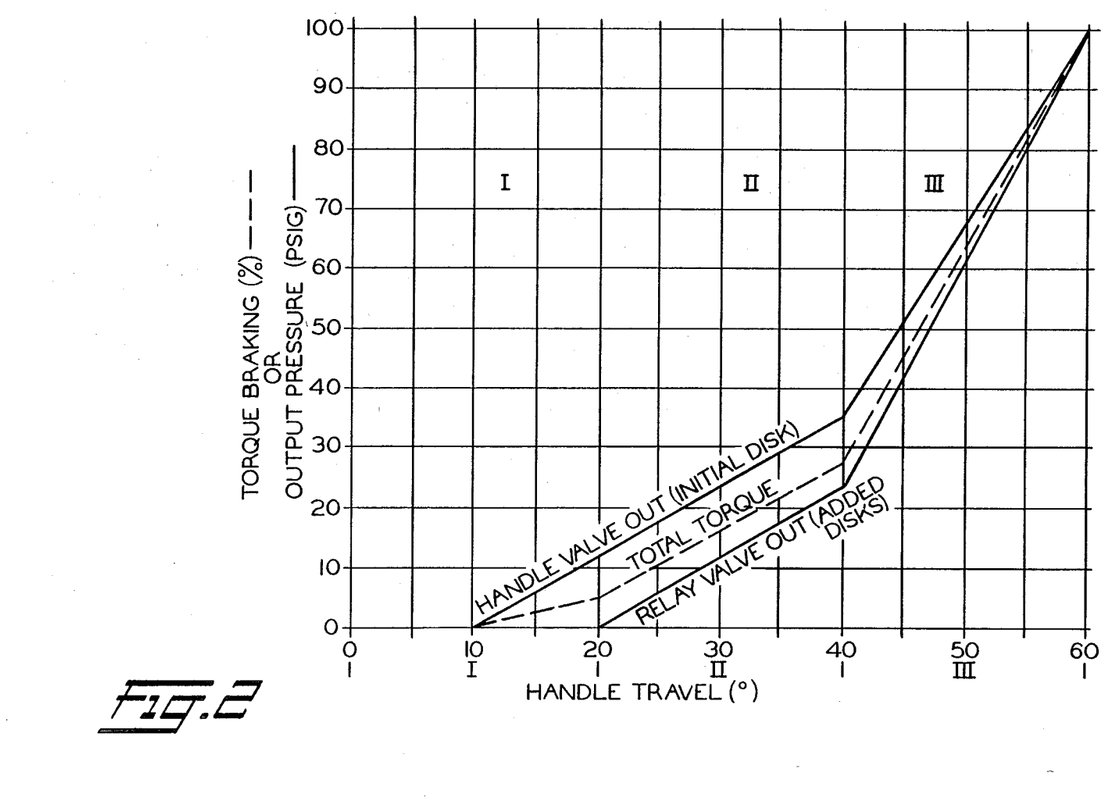
FIG. 2 is a graphical representation of the handle travel versus torque and pressure for an embodiment of a three-disk brake control system.

As seen in FIG. 1, the brake control system for a three-disk brake actuator arrangement includes the three brake actuators 1, 2 and 3 which act on three brake disks 4, 5 and 6. The brake disks 4, 5 and 6 are rigidly connected to a single shaft (not shown). Each of the disk brake actuators 1, 2 and 3 has a service braking portion (1a, 2a, 3a) and a parking brake portion (1b, 2b, 3b) respectively. Service braking portions (1a, 2a and 3a) exert a braking force which is a function of the fluid pressure introduced thereto. The parking brake portions (1b, 2b, 3b) are spring-applied, air-released devices. A handle valve 7 allows for manually controlling the flow of modulating braking pressure to the disk brake actuators 1, 2 and 3. If the subject multiple disk brake system is to be used on oil field drilling and service equipment, it is often desirable to provide a light brake torque initially and a heavier brake torque at a later point. The graphical representation of the handle travel versus output pressure and the braking torque shown in FIG. 2 illustrates the range of output pressures over which these desired torque braking levels can be achieved. It can be further seen in FIG. 2 that the multiple disk brake system exhibits performance characteristics which can be divided into three areas relative to handle displacement. These areas are designated by I, II, and III shown in FIG. 2, wherein I constitutes an initial range performance; II constitutes a midrange performance; and III constitutes an upper range performance. The distinguishing characteristics of each area will be described hereinafter in further detail. As seen in area I of FIG. 2, handle valve 7 has traveled between 0° and 20° from a total possible range of 60°; such 20° travel corresponding to a total of 15 psig. output pressure and approximately 9 percent of the total torque braking available. By proportioning the handle travel versus output pressure and torque braking in this manner shown in area I, it is possible to achieve a light torque braking over a relatively large portion of the travel range of the handle valve 7 thus allowing for an accurate, quick response in manually controlling the multiple disk brake system. To achieve this light torque braking value, a relay valve 8, connected to the output of the handle valve 7, proportionally reduces the output braking pressure to the disk brake actuators 1, 2 or 3 which have not been selected to handle the initial braking. The output pressure of the handle valve 7 is used to operate the pilot portion 8a of the relay valve 8 such that, only after a certain output braking pressure is achieved, will the relay valve 8 open to allow the flow of fluid pressure to all disk brake actuators 1, 2 and 3. As an example, the pilot portion 8a can be set to operate at 15 psig. which approximately corresponds to one atmosphere. Associated with each disk brake actuator 1, 2 and 3 is a first shuttle valve 10, a second shuttle valve 11, and a third shuttle valve 12, respectively (shown in FIG. 1). The output of the relief valve 8 is connected to one of two inputs to each shuttle valve 10, 11, 12; shuttle valves 10, 11, 12 always operate to transfer the higher of the two input pressures available to the device.

The output braking pressure of the handle valve 7 is also connected to an input of a selector valve arrangement, shown generally at 9, used to direct the flow of the output braking pressure to one of the disk brake actuators 1, 2 or 3. The selector valve arrangement 9, shown in FIG. 1, has two dual pilot-controlled selector valves 13, 14. In the first position of the first selector valve 13, output braking pressure is directed to the third disk brake actuator 3 through the third shuttle valve 12. When the first selector valve 13 is in this first position, a second selector valve 14 is disabled regardless of the position the second selector valve 14. This disabling comes about as a result of the input of the second selector valve 14 being tied to the output of the first selector valve 13 such that, only when the first selector valve 13 is in the second position will the braking pressure be directed to the input of the second selector valve 14.

As shown in FIG. 1, the second selector valve 14 is in the first position which, if braking pressure were present at the input of the second selector valve 14, would result in the pressurization of the second disk brake actuator 2 through the second shuttle valve 11. If the second selector valve 14 would be moved to the second position, braking pressure present at the output of the second selector valve would be directed to the first disk brake actuator 1 through the first shuttle valve 10. The operation of the first and second selector valves 13, 14 to respective first and second positions is controlled by respective first and second pilot portions 13a, 13b and 14a, 14b of each selector valve 13, 14.

Associated with the first selector valve 13 is a first and second pilot portion 13a and 13b which alternately receives an input signal pressure thereby operating the first selector valve 13 to the first or second position according to which pilot portion 13a or 13b has received the input signal pressure. Likewise, a first and second pilot portion 14a and 14b alternately receives an input signal pressure to operate the second selector valve 14 according to which pilot portion 14a or 14b has received the input signal pressure.

The input signal pressure directed to the respective first and second pilot portions 13a, 13b and 14a, 14b of each selector valve 13, 14 is generated by a binary counter circuit shown generally at 15 which consists of a number of binary count portions 18, 19, 20 and 21 essentially corresponding to the number of disk brake actuators to be controlled. In the subject illustration, three disk brake actuators 1, 2 and 3 are used and a binary counter circuit 15 therefore is provided which counts to four. In order to operate continually, that is, without outputting a count to a fourth disk brake actuator which does not exist, a skip valve 17 is provided to reduce the count to the necessary three units. Each of the binary count portions 18, 19, 20 and 21 consist essentially of a dual-pilot controlled directional valve 18a, 19a, 20a and 21a, a shuttle valve 18b, 18c, 20b and 20c, and a restriction 19b, 19c, 21b and 21c. Each binary count portion 18, 19, 20 and 21 is interconnected such that, a sequencing binary count is achieved upon receiving an input pulse-type trigger pressure. This momentary introduction of a fluid pressure is first directed to a counter shuttle valve 16 having its output in communication with the input of the first binary count portion 18. The counter shuttle valve output increments the binary counter section to the next count sequence thereby directing an input signal pressure to the next pilot portion of the selector valves 13, 14 to be operated.

The trigger input which effects the sequencing of the binary counter circuit 15 is initiated from an interlocking reset section shown generally at 23. This section 23 serves the dual purpose of sequencing the binary counter circuit 15 and of releasing the parking brake sections 1b, 2b and 3b of the disk brake actuators 1, 2 and 3. The interlocking reset section 23 consists essentially of a manual operating valve 24 having an operator 27, and an interlocking valve 25. The interlocking valve 25 is a three-way, two-position pilot-controlled valve which, in a first position is neutral to both the binary counter circuit 15 and the parking brake portions 1b, 2b and 3b. In the second position, the interlocking valve 25 provides a flow path for fluid pressure to be directed to both the binary counter circuit 15 and the parking brake sections 1b, 2b and 3b, provided the manually operated valve 24 has been activated. The interlocking valve 25 is operated to this second position by the introduction of fluid pressure to the pilot portion 25a from an interlocking shuttle valve 26. The interlocking shuttle valve 26 has as one of its inputs the output braking pressure which is outputted from the handle valve 7. In this manner, the interlocking valve 25 will not allow the release of the parking brake portions 1b, 2b and 3b unless the output braking pressure from the handle valve 7 is sufficient to ensure that the disk brake actuators 1, 2 and 3 are holding the load.

In operation, a static condition is assumed to exist for the disk brake control system shown in FIG. 1. As the handle valve 7 is operated within the initial range shown in area I of FIG. 2, a small output braking pressure is supplied to the first selector valve 13 which is shown in the second position. This same output braking pressure is applied to the pilot portion 8a of the relay valve 8. The relay valve 8 is selected to provide a pressure offset which prevents fluid pressure from being directed to the brake actuators 1, 2 or 3 which have not been sequenced to provide the initial torque braking. The first selector valve 13 is in the second position as a result of an input signal pressure introduced to the second pilot portion 13b from the output of the second directional valve 19b of the binary count portion 19. In this second position, the first selector valve 13 directs fluid pressure from the handle valve 7 to one input of the third shuttle valve 12. The second input to the third shuttle valve 12 is at zero during operation of the disk brake control system in area I of FIG. 2. The operation of this third shuttle valve 12 is such that, the higher of the two input pressures is directed to the input of the service portion 3a of the third disk brake actuator 3 shown in FIG. 1. There is no pressure output from the first and second shuttle valves 10 and 11 respectively, since neither of the inputs to the first and second shuttle valves 10 and 11 have been pressurized. As the handle valve 7 is operated beyond the area I of FIG. 2 and into area II, the increased braking pressure is delivered through the first selector valve 13 in the manner previously described. Additionally, the output braking pressure from the handle valve 7 is now sufficient to operate the pilot portion 8a of the relay valve 8 such that, supplementary fluid pressure can flow through the relay valve 8 to the first and second shuttle valves 10 and 11. Such supplementary fluid pressure flows from the handle valve 7 such that, the fluid pressure through the relay valve 8 is always in proportion to the output braking pressure and is offset from the output braking pressure by the setoff pressure which operates the pilot portion 8a of the relay valve 8. During operation of the disk brake control system within area II shown in FIG. 2, the total torque braking shown as the dotted line increases at a faster rate during operation of the handle valve within a 20° to 40° travel range. This increasing torque braking is a result of the first and second disk brake actuators 1 and 2 being added to the disk brake control system as a result of relay valve 8 operating to allow fluid pressure to the service portions 1a and 2a of the first and second disk brake actuators 1 and 2.

As the handle valve 7 is operated into area III of FIG. 2, both the total torque braking shown in dotted line, and the output braking pressure of the three disk brake actuators 1, 2 and 3 increase at a faster rate than in area II of FIG. 2. This relationship is a result of the handle valve 7 characteristic of delivering a higher fluid pressure over the 40° to 60° operating range and is not a result of any feature of the disk brake control system. This characteristic allows for increasing the total torque braking over the 40° to 60° operating range of the handle valve 7 thus providing the heavier torque braking needed to retard the movement of the oil field drilling equipment as previously described.

Simultaneous to the handle valve 7 directing braking pressure to the relay valve 8 and a first selector valve 13, this pressure is also directed to an interlocking shuttle valve 26 and then to the pilot portion 25a of the interlocking valve 25. Fluid pressure present in the pilot portion 25a moves the interlocking valve 25 to the second position. With the interlocking valve 25 in the second position, depressing the operator 27 of the manual valve 24 allows fluid pressure to flow to the parking brake portions 1b, 2b and 3b of the disk brake actuators 1, 2 and 3. It can be appreciated that only when sufficient pressure is being delivered through the handle valve 7 to thus operate the pilot portion 25a of the interlocking valve 25, can the parking brake portions 1b, 2b and 3b be released. In this manner, the interlocking reset portion shown generally at 23, insures that the parking brake 1b, 2b and 3b cannot be released unless the service brake portions 1a, 2a and 3a are holding the load.

Assuming the braking operation previously described has been completed, that the oil field drilling equipment has been brought back up to operating speed, and it is now desired to operate the disk brake control system to again retard the movement of the oil field drilling equipment, certain preconditions which exist as a result of the previous brake operation must first be described. With the handle valve 7 returned to the zero position, braking pressure is delivered to the pilot portion 25a of the selector valve 25 over a second input 26b of the interlocking shuttle valve 26, such fluid pressure being supplied from the parking brake portions 1b, 2b and 3b thereby maintaining the interlocking valve 25 in the second position. With the interlocking valve 25 in the second position, fluid pressure is not delivered to the parking brake portions 1b, 2b and 3b of the disk brake actuators 1, 2 and 3 until the manually operated valve 24 is depressed. The parking brake sections 1b, 2b and 3b remain in their released position, however, because the fluid pressure previously delivered is prevented from venting due to the selector valve 25 being in the second position. Also during the previous braking operation, the first binary counter portion 18 assumed the second position as the result of the second binary counter portion 19 supplying fluid pressure to the counter shuttle valve 18b. Additionally, prior to releasing the service brake to resume normal oil field drilling operations, it was necessary to depress the operator 27 of the manual valve 24 which, as previously discussed, released the parking brake portions 1b, 2b and 3b. Such manual valve operation also triggered an input pulse-type trigger pressure to the trigger shuttle valve 16. With the first binary counter portion 18 in the second position, the trigger pressure sequenced the binary counter section 23 to the next count. The binary counter circuit 15 in the next count status, no longer pressurizes the second pilot portion 13b of the first selector valve 13 but now pressurizes the first pilot portion 13a of the first selector valve 13. The first selector valve 13 is now moved to the first position whereby the output braking pressure flowing through the handle valve 7 is directed through the first selector valve 13 to an input of the second selector valve 14. Depending on which position the second selector valve 14 is in, the braking pressure flowing through the first selector valve 13 will be directed to either the first or second disk brake actuator 1 or 2. The next count status, as previously described, results in the second selector valve 14 being in the second position whereby the second pilot portion 14b is pressurized. With the second selector valve 14 in the second position, a braking pressure is directed to the second disk brake actuator 2 through the second shuttle valve 11.

Following completion of this braking operation and a desire to resume oil field drilling operations, the same startup and braking procedures will be followed as previously described.

Figure 3:
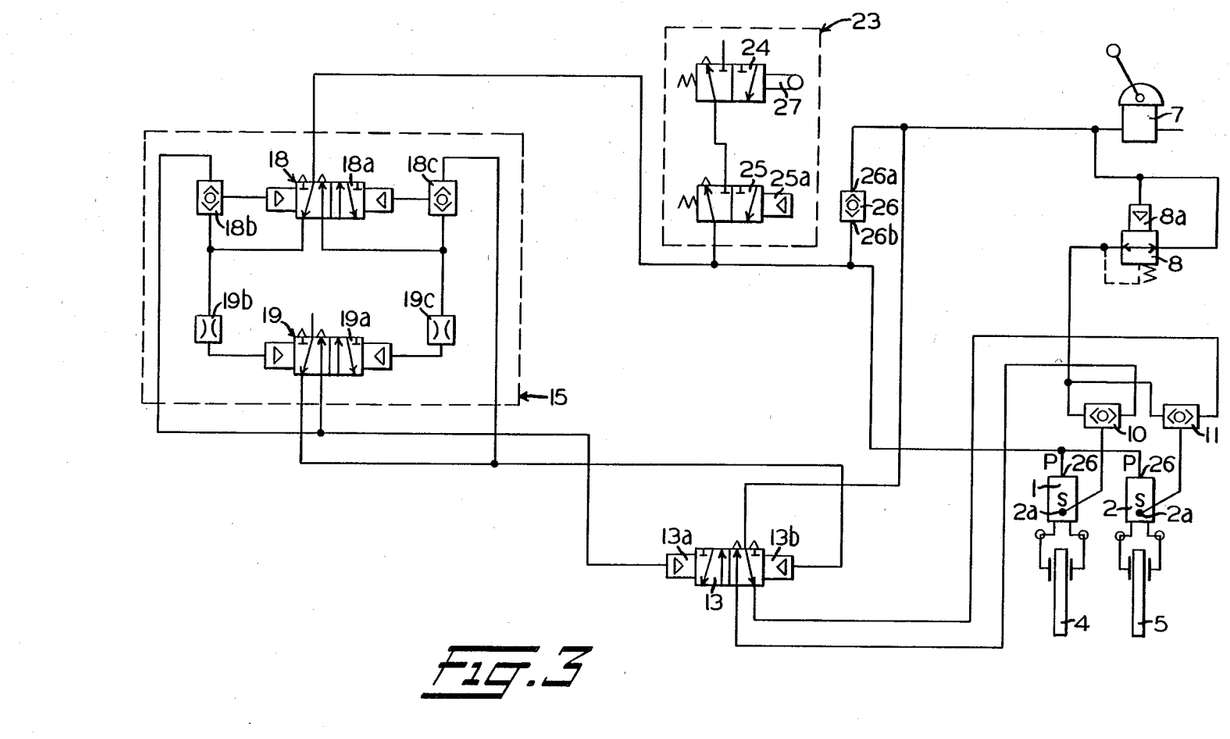
FIG. 3 is a diagrammatical representation of a two-disk brake control system constructed in accordance with the invention.

As seen in FIG. 3, a two-disk brake actuator system can be used whereby substantially the same components as were supplied in the three-disk brake actuator system are also provided. As such, the description and operation of the disk brake control system shown in FIG. 2 will essentially resemble the previous description and operation with the same reference numbers being used for like components.

A handle valve 7 is operated to various positions to provide a range of braking pressure levels to a selector valve 13. A selector valve 13 is a dual-pilot controlled directional valve whereby, in the first position the brake pressure is directed to a first disk brake actuator 1 through a first shuttle valve 10. In the second position, the selector valve 13 directs the output braking pressure to a second disk brake actuator 2 through a second shuttle valve 11. The output braking pressure from the handle valve 7 is also directed to a pilot portion 8a of a relay valve 8. When the pilot pressure presented to the pilot portion 8a has reached a sufficient level, the relay valve 8 will allow the flow of fluid pressure to a second input of both the first and second shuttle valves 10 and 11. The relay valve 8 output pressure is then a fixed ratio with the braking pressure of the handle valve 7. A first and second shuttle valve 10 and 11, as previously discussed, have two inputs whereby the higher of the two input pressures will be directed to the service portion 1a and 2a of the disk brake actuators 1 and 2.

A binary counter circuit is provided having two binary count portions 18 and 19. The first binary count portion 18 consists of a dual-pilot control directional valve 18a, a binary counter shuttle valve 18b, and a restriction 18c. The second counter portion consists of a dual-pilot controlled directional valve 19a and restrictions 19b and 19c. Such a binary counter circuit provides a binary two count which, since there is only two disk brake actuators 1 and 2, precludes the use of a skip valve as was required in the previous application. Binary counter circuit 15 outputs a signal pressure to either the first or second pilot portion 13a or 13b of the selector valve 13 depending on the count condition. As shown in FIG. 3, the selector valve 13 is in a second position thereby pressurizing the service portion 2a of the second disk brake actuator 2 through the second shuttle valve 11. As in the previous application, an interlocking reset circuit 23 is also provided to provide a sequencing trigger pressure to the binary counter circuit 15 and to provide a flow path for fluid pressure to release the parking brake portions 1b and 2b of the disk brake actuators 1 and 2.

The interlocking reset circuit consists of a manual operating valve 24 and a selector valve 25 having a pilot portion 25a. The pilot portion 25a of the selector valve 25 is controlled by fluid pressure through a selector shuttle valve 26 which has as one of its inputs the output braking pressure from the handle valve 7. As previously discussed, this provides the interlocking feature which precludes release of the parking brake unless the output braking pressure is sufficient to the disk brake actuators to hold the load.

Figure 4:
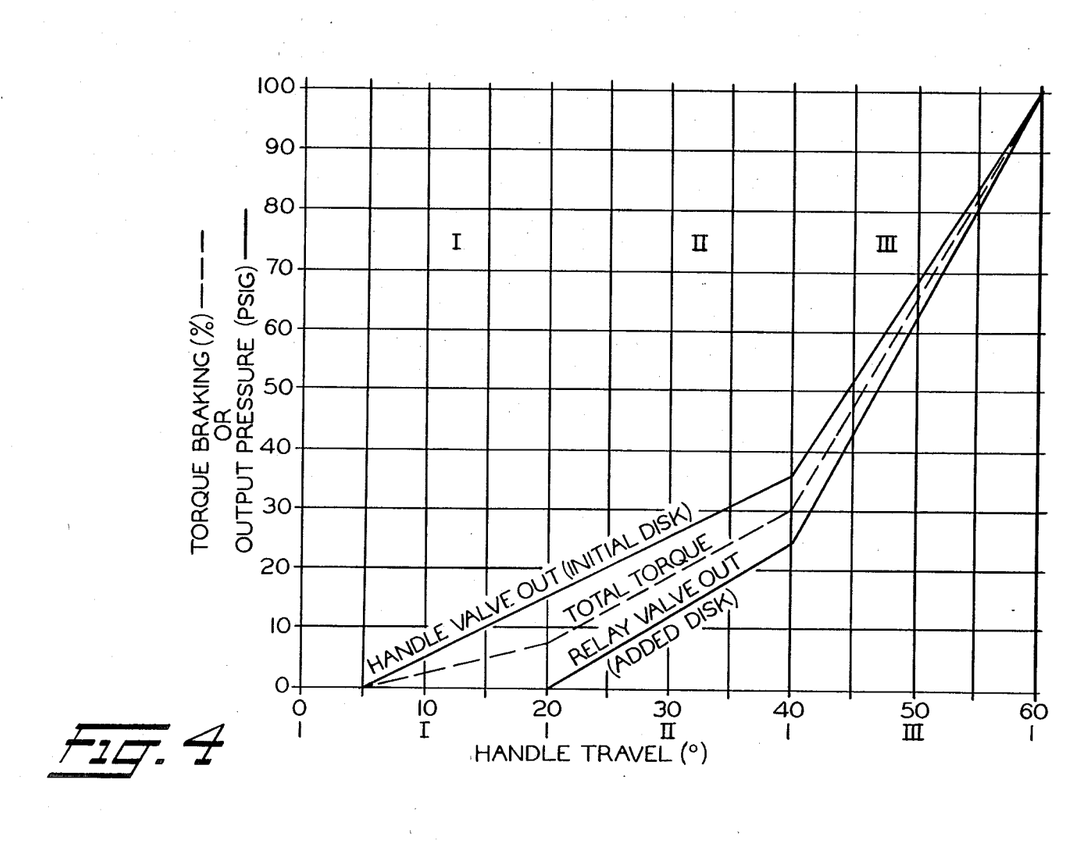
FIG. 4 is a graphical representation of the handle travel versus torque and pressure of an embodiment of a two-disk brake control system.

In operation, the operating characteristics of the two-disk brake control system can be divided into three categories shown as areas I, II and III of FIG. 4. A first or low torque braking range is similar to that shown in FIG. 2 whereby fluid pressure delivered through the handle valve 7 flows through the selector valve 13 through the second shuttle valve 11 into the service portion 2a of the second disk brake actuator 2. The braking pressure from the handle valve 7 has not reached a level sufficient to operate the pilot portion 8a of the relay valve 8, therefore no pressure is provided to the first shuttle valve 10.

The operating characteristics of areas II and III of FIG. 4 are the same as shown in FIG. 2 except that as the relay valve 8 operates to allow the flow of fluid pressure, only the one other disk brake actuator 1 is added to the braking operation. As in the application shown in FIG. 1, the binary counter circuit 15 is triggered to the next count output from an impulse trigger pressure generated by the interlocking reset circuit 23. When the interlocking valve 25 is in the second position and the operator 27 of the manual valve 24 is depressed, the binary counter circuit 15 will sequence to the next count thereby changing the pilot pressure to the selector valve 13 to the opposite pilot portion 13a or 13b.

Though the above discussion has presented a disk brake control system using either two or three disk brake actuators and using a pneumatic binary counter circuit and pneumatic pilot control portions of the various selector valves, other alternatives for practicing the invention are contemplated herein as well. For example, an electronic counting means in conjunction with a pneumatic/electronic sensor can be used in lieu of the binary counter shown in FIG. 1 and solenoid actuated directional valves can be used in place of the pilot actuated selector valves shown in FIG. 1.

I claim:

1. A fluid pressure operated brake control for a plurality of disk brakes actuated by a plurality of disk brake actuators having respective service braking and parking brake portions, said brake control comprising:
   (a) a handle valve operable over a range of travel corresponding to a range of delivery of such fluid pressure;
   (b) a plurality of actuator shuttle valves having respective first and second inputs and a shuttle output connected to such actuator service braking portions, said actuator shuttle valve being effective for transmitting the higher of such fluid pressures present at said respective first and second inputs;
   (c) relay valve means connected to said handle valve for communicating a predetermined relay fluid pressure therethrough upon such fluid pressure delivery from said handle valve reaching a predetermined value, such relay fluid pressure being communicated to said respective first inputs of said plurality of actuator shuttle valves; and
   (d) selector means for directing the flow of such handle valve fluid pressure delivery to one of said second inputs of said plurality of actuator shuttle valves, said selector means having a plurality of flow paths, one of said plurality of flow paths being established by a selectable sequencing operation upon occurrence of a preselected sequencing signal.

2. A brake control, as set forth in claim 1, wherein said selector means includes a counter means for outputting a count signal that increments the selectable sequencing operation to select the next one of said plurality of flow paths over which such handle valve fluid pressure is directed.

3. A brake control, as set forth in claim 1, further comprising an interlocking means for generating such preselected sequencing signal upon release of such parking brake portions of such plurality of disk brake actuators.

4. A brake control, as set forth in claim 2, wherein said counter means includes a plurality of pneumatically operated directional valves, said plurality of directional valves maintaining respective valve positions in the absence of such fluid pressure directed thereto, such maintained valve positions thereby establishing a counts memory.

5. A brake control, as set forth in claim 1, wherein said relay valve means includes a relay valve having a pilot portion connected to said handle valve such that, when such handle valve fluid pressure delivery reaches such predetermined value, said relay valve opens thereby communicating such relay fluid pressure therethrough.

6. A brake control, as set forth in claim 5, wherein such predetermined value of such handle valve fluid pressure can be varied such that, such opening of said relay valve is variable.

7. A brake control, as set forth in claim 2, wherein said plurality of selector means flow paths is odd in number and said counter means includes a skip count means for reducing an even numbered counter means output to an odd numbered counter means output.

8. A brake control, as set forth in claim 5, wherein the input to said relay valve is connected to the output of said handle valve such that such relay fluid pressure is proportional to such handle valve fluid pressure delivery.

9. A brake control, as set forth in claim 3, wherein said interlocking means includes a manual operating valve having an actuator portion; a pilot-controlled, two-position, interlocking directional valve; and an interlocking shuttle valve having a first input connected to said handle valve, a second input connected to such parking brake portions and to an output of said interlocking directional valve; said interlocking shuttle valve having an output connected to a pilot portion of said interlocking directional valve; and said manual operating valve effecting pressurization of such parking brake portions and generation of such preselected sequencing signal when such actuator portion is operated and said pilot portion of said interlocking directional valve is pressurized.

10. A brake control, as set forth in claim 1, wherein said selector means includes at least one dual-pilot controlled, multiposition directional valve.

11. A method for controlling a plurality of disk brakes actuated by a plurality of disk brake actuators having respective service braking and parking brake portions, said brake controlling method comprising:

(a) regulating the delivery of a braking fluid pressure by operation of a handle valve over a range of handle travel;
(b) communicating such braking fluid pressure to a pilot portion of a relay valve;
(c) opening said relay valve when such braking fluid pressure reaches a predetermined value, said open relay valve effecting communication of a relay fluid pressure therethrough;
(d) receiving such relay fluid pressure at a first input of a plurality of actuator shuttle valves;
(e) selecting one flow path from a plurality of flow paths corresponding in number to such plurality of brake actuator service braking portions;
(f) directing such braking fluid pressure over said one selected flow path to a second input of one of said plurality of actuator shuttle valves;
(g) comparing such relay fluid pressure presented to said first actuator shuttle valve inputs with such braking fluid pressure presented to said second input of said one actuator shuttle valve and transmitting the higher of such fluid pressures to such service braking portions of such disk brake actuators; and
(h) incrementing a counter means form a count to the next count upon release of such parking brake portions of such disk brake actuators, such next count effecting said selecting of said one flow path such that, a next flow path from said plurality of flow paths is selected.

* * * * *

UNITED STATES PATENT AND TRADEMARK OFFICE
CERTIFICATE OF CORRECTION

PATENT NO. : 4,542,944
DATED : September 24, 1985
INVENTOR(S) : Michael D. Lyons It is certified that error appears in the above–identified patent and that said Letters Patent are hereby corrected as shown below:

Column 10, line 25, delete "form" and insert --from--

Signed and Sealed this

Thirty-first Day of December 1985

[SEAL]

Attest:

Attesting Officer

DONALD J. QUIGG

Commissioner of Patents and Trademarks